(12) United States Patent
Knittel

(10) Patent No.: US 8,077,584 B2
(45) Date of Patent: Dec. 13, 2011

(54) BEAM SHIFTING ELEMENT FOR AN OPTICAL STORAGE SYSTEM

(75) Inventor: Joachim Knittel, Tuttlingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 802 days.

(21) Appl. No.: 11/982,194

(22) Filed: Nov. 1, 2007

(65) Prior Publication Data
US 2008/0112302 A1 May 15, 2008

(30) Foreign Application Priority Data
Nov. 9, 2006 (EP) .................................. 06123750

(51) Int. Cl.
*G11B 7/00* (2006.01)
(52) U.S. Cl. ........................ 369/112.09; 369/112.28
(58) Field of Classification Search ........... 369/112.28, 369/112.09, 112.14, 44.23, 112.21
See application file for complete search history.

(56) References Cited

U.S. PATENT DOCUMENTS

| | | | |
|---|---|---|---|
| 4,266,847 A | 5/1981 | Menke | |
| 4,822,974 A | 4/1989 | Leighton | |
| 5,202,868 A * | 4/1993 | Terao et al. | 369/44.17 |
| 5,477,386 A * | 12/1995 | Okuda et al. | 369/112.28 |
| 5,521,897 A * | 5/1996 | Nishikawa | 369/112.28 |
| 5,626,411 A | 5/1997 | Takahashi et al. | |
| 5,828,482 A | 10/1998 | Jain | |
| 6,038,089 A * | 3/2000 | Maruyama et al. | 369/112.28 |
| 6,225,595 B1 * | 5/2001 | Wei et al. | 219/121.69 |
| 7,518,086 B2 * | 4/2009 | Norikane et al. | 369/100 |
| 7,646,546 B1 * | 1/2010 | O'Shaughnessy et al. | 359/669 |
| 2005/0030875 A1 | 2/2005 | Horimai | |
| 2007/0121468 A1 | 5/2007 | Koyama et al. | |
| 2007/0177270 A1 * | 8/2007 | Dickson et al. | 359/566 |

FOREIGN PATENT DOCUMENTS

| | | |
|---|---|---|
| EP | 0871327 | 10/1998 |
| JP | 06131689 | 5/1994 |
| WO | WO01/73504 | 10/2001 |
| WO | WO2004/051323 | 6/2004 |

OTHER PUBLICATIONS

Shin'ichi Nakatsuka, Akira Arimoto, Seiji Maruo, Shinya Kobayashi: "Resolution enhancement printing with a variable spot size laser diode" Applied Optics, vol. 36, No. 24, Aug. 20, 1997, pp. 5866-5880.
Wenhai Liu, Demetri Psaltis: "Pixel size limit in holographic memories" Optics Letters, vol. 24, No. 19, Oct. 1, 1999, pp. 1341-1342.
Sergei S. Orlov, William Phillips, Eric Bjornson, Yuzuru Takashima, et al.,: "High transfer-rate high-capacity holographic disk dat-storage system" Applied Optics, vol. 43, No. 25, Sep. 1, 2004, pp. 4902-4914.

(Continued)

*Primary Examiner* — Thang Tran
(74) *Attorney, Agent, or Firm* — Tutunjian & Bitetto, P.C.

(57) ABSTRACT

The present invention relates to a beam shifting element and to an apparatus for reading from and/or writing to optical storage media using in such a beam shifting element.
According to the invention, the beam shifting element has at least a first optical element for deflecting an incoming light beam by a first angle and a second optical element for deflecting the light beam coming from the first optical element by a second angle opposite to the first angle, wherein the first optical element and the second optical element are optical elements with an adjustable deflection angle.

7 Claims, 4 Drawing Sheets

OTHER PUBLICATIONS

Search report dated Aug. 8, 2005.
Chao, Tien-Hsin et al., "Compact Holographic Data Storage System" Mass Storage Systems and Technologies, 2001. MSS 01 18th IEEE Symposium On, IEEE, Piscataway, NJ, USA, Apr. 17, 2001, p. 237, XP031462095 ISBN: 978-0-7695-0849-8.

Chao, Tien-Hsin, Non Volatilerad-Hard Holographic Memory, presentation at Non Volatile Memore Technology Symposium 2001; San Diego CA Nov. 7-8, 2001 http://klabs.org/richcontent/MemoryContent/nvmt_symp/nvmts_2001/papers_presentations/04_holographic/04_chao-foils.pdf.

* cited by examiner

BEAM SHIFTING ELEMENT FOR AN OPTICAL STORAGE SYSTEM

This application claims the benefit, under 35 U.S.C. §119 of EP Patent Application 06123750.9, filed 9 Nov. 2006.

FIELD OF THE INVENTION

The present invention relates to an apparatus for reading from and/or writing to optical storage media, such as holographic storage media, and more specifically to a beam shifting element for use in such an apparatus.

BACKGROUND OF THE INVENTION

In holographic data storage digital data are stored by recording the interference pattern produced by the superposition of two coherent laser beams, where one beam, the so-called 'signal beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded signal beam.

One advantage of holographic data storage is an increased data capacity. Contrary to conventional optical storage media, the volume of the holographic storage medium is used for storing information, not just a single or few 2-dimensional layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the signal beam by the spatial light modulator (SLM) and detected with a detector array.

In an apparatus for reading from and/or writing to disk-type holographic storage media the objective lens is mounted on an actuator. The objective lens, therefore, moves relative to the remaining optical components, e.g. for tracking or to keep the objective lens on a fixed position relative to the rotating disk surface during recording. The shift of the objective lens causes a strong distortion of the hologram during recording, and also a shift of the pixels on the detector array, because the remaining optical system does not move. Consequently, the negative effects of the movement of the objective lens have to be reduced to a minimum. Similar problems arise for other types of optical storage media, especially for high-density optical storage media.

U.S. Pat. No. 5,828,482 discloses a beam shifting element, which achieves a beam shift by tilting a parallel plate. However, for an apparatus for reading from and/or writing to holographic storage media a thick glass plate is required to achieve the necessary lateral shifts of about 100 µm. This makes it difficult to achieve compensation at a high frequency, as the required forces are relatively high. The tilting of a parallel plate is, therefore, mainly a solution for a quasi-static system.

SUMMARY OF THE INVENTION

It is an object of the invention to propose an alternative solution for a beam shifting element, which allows to achieve beam shift compensation at high frequency.

According to the invention, this object is achieved by a beam shifting element having at least a first optical element for deflecting an incoming light beam by a first angle and a second optical element for deflecting the light beam coming from the first optical element by a second angle opposite to the first angle, wherein the path length of the light beam between the first optical element and the second optical element is adjustable. The position of the light beam on the second optical element after deflection by the first optical element depends on the path length between the two optical elements. Therefore, by adjusting the path length the position of the light beam on the second optical element is controlled. The second optical element then deflects the light beam in such way that it is parallel to the light beam before deflection by the first optical element.

Advantageously, the path length of the light beam is adjustable through an adjustment of the first angle and the second angle. For a given distance between the optical elements the path length depends on the deflection angle. Therefore, an adjustment of the deflection angle allows to adjust the path length, and hence the shift of the light beam. This solution has the advantage that no movable parts are necessary. In addition, by independently controlling the deflection angles of the first optical element and the second optical element, apart from the shift of the light beam also the direction of the light beam is adjustable. An example of an optical element with an adjustable deflection angle is a grating with a switchable grating period. Such a grating is described, for example, in Chao et al.: "Compact Holographic Data Storage System", Proceedings of the Eighteenth IEEE Symposium on Mass Storage Systems and Technologies Vol. 00 (2001), pp. 237-247. A further example of an optical element with an adjustable deflection angle is an electrooptic beam scanner, which has an adjustable refraction index. Such a beam scanner is shown, for example, in Fang et al.: "Shape-Optimized Electrooptic Beam Scanner: Experiment", IEEE Phot. Tech. Lett. Vol. 11 (1999), pp. 66-68. Alternatively, the path length of the light beam is adjustable through an adjustment of the distance between the first optical element and the second optical element. The distance is preferably adjusted by moving one or more of the optical elements. The optical elements may for example be prisms, diffraction gratings, or holographic elements. When the distance between the two optical elements is changed, the incoming light beam is laterally shifted. As the first and the second optical element deflect the light beam by opposite angles, the shifted light beam is parallel to the incoming light beam. The beam shifting element according to the invention has the advantage that only a relatively thin optical element needs to be shifted. This reduces the occurring forces, which allows to operate the beam shifting element at a high frequency.

Advantageously the beam shifting element further has a third optical element for deflecting the light beam coming from the second optical element by the second angle, and a fourth optical element for deflecting the light beam coming from the third optical element by the first angle. Preferentially, the distance between the third optical element and the fourth optical element is also adjustable. In combination the second and third optical elements deflect the light beam by twice the second angle. This is compensated for by the deflection angles of the first and fourth optical elements, so that also in this case the shifted light beam is parallel to the incoming light beam. In addition, by using four optical elements the beam shifting element can be brought into a condition where the light beam is not shifted. This allows to simplify the design of an optical system using the beam shifting element. It is to be noted that it is likewise possible that the third and fourth optical elements deflect the light beam by a different angle than the first and second optical elements. Furthermore, the third and fourth optical elements may have a different dispersion than the first and second optical elements. This allows to minimize the influence of the wavelength of the light beam on the beam shift, which is advantageous for applications where multiple wavelengths occur, e.g. in cameras.

Preferably, the first optical element and the fourth optical element are fixed, whereas the second optical element and the third optical element are movable. If both optical elements are moved together, a relatively small movement along the optical axis leads to a relatively large shift of the light beam. Alternatively, if both elements are moved independently, one of the optical elements may perform a coarse shift of the light beam, whereas the other optical element performs a fine shift.

Advantageously, the second optical element and the third optical element form a unit. This simplifies the fabrication of the beam shifting element, as the adjustment of one optical element can be omitted. In addition, the movement of the second optical element and the third optical element is automatically synchronized.

Preferably, an apparatus for reading from and/or writing to optical storage media, e.g. holographic storage media, has a beam shifting element according to the invention for shifting a light beam in a first direction. The beam shifting element is useful for keeping the light beam on the optical axis of an objective lens, which is moved for tracking or for keeping it on a fixed position relative to a rotating disk surface during recording. In this way distortions of the light beam are minimized. In case the light beam also needs to be shifted in a second direction, a further beam shifting element according to the invention is preferentially provided. Of course, the beam shifting element according to the invention can likewise be used in any other optical setup where a shift of a light beam is needed.

Advantageously, the apparatus has a control element for adjusting the shift of the light beam caused by the beam shifting element. The control element adjusts the shift of the light beam in response to a position signal, which indicates a deflection of the light beam from the desired position. Alternatively, the control element adjusts the shift of the light beam in response to a signal derived from the control signal of an actuator of the objective lens. In this way it is ensured that the light beam automatically remains on the optical axis of the objective lens. The control signal of the actuator may be low-pass filtered before deriving the signal for the control element, in order to avoid too many high-frequency adjustments of the beam shift.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
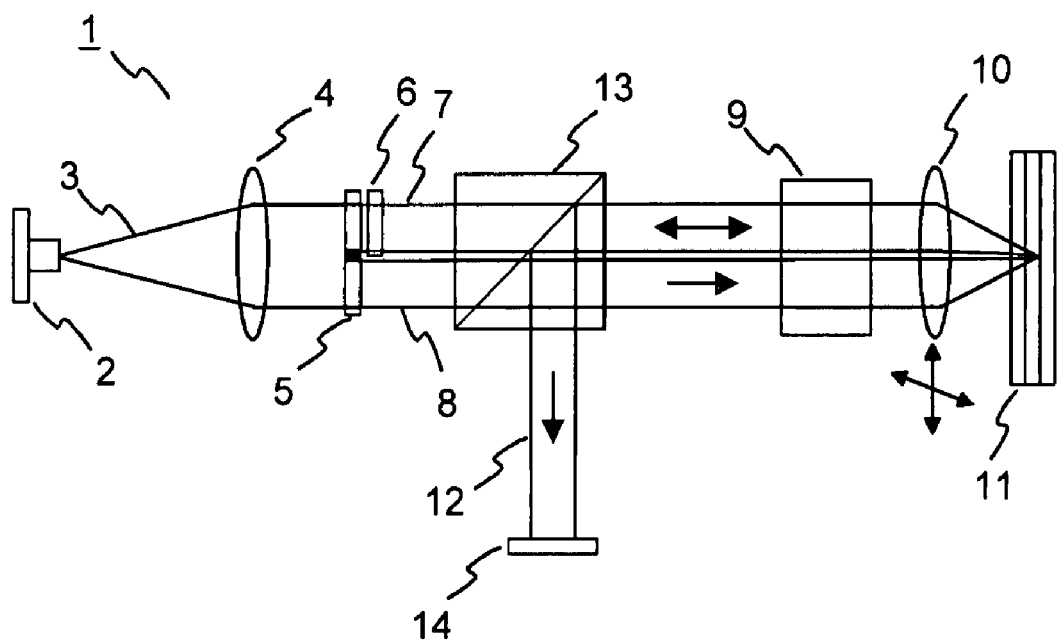
FIG. 1 shows an exemplary setup of an apparatus for reading from and/or writing to holographic storage media, FIG. 2 schematically depicts a first example of a beam shifting element according to the invention.

In holographic data storage digital data are stored by recording the interference pattern produced by the superposition of two coherent laser beams. An exemplary setup of an apparatus 1 for reading from and/or writing to holographic storage media is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "reference beam" 8, are focused into a holographic storage medium 11, e.g. a holographic disk, by an objective lens 10. At the intersection of the object beam 7 and the reference beam 8 an interference pattern appears, which is recorded in a photo-sensitive layer of the holographic storage medium 11. A beam shifting element 9 compensates for distortions of the object beam 7 and the reference beam 8 due to movements of the objective lens 10.

The stored data are retrieved from the holographic storage medium 11 by illuminating a recorded hologram with the reference beam 8 only. The reference beam 8 is diffracted by the hologram structure and produces a copy of the original object beam 7, the reconstructed object beam 12. This reconstructed object beam 12 is collimated by the objective lens 10 and directed onto a 2-dimensional array detector 14, e.g. a CCD-array, by a second beam splitter 13. The array detector 14 allows to reconstruct the recorded data.

Figure 2:
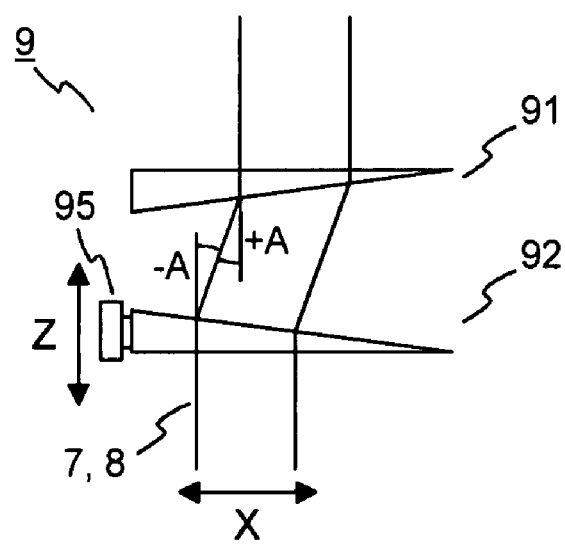

In FIG. 2 a first example of a beam shifting element 9 according to the invention is shown. The beam shifting element 9 has two optical components 91, 92 for changing the propagation direction of a light beam 7, 8. In the figure these optical components are a first prism 91 and a second prism 92. The first prism 91 is fixed, whereas the second prism 92 can be moved in Z-direction along the optical axis by an actuator 95. Of course, it is likewise possible to move the first prism 91 while keeping the second prism 92 fixed, or to move both prisms 91, 92. By moving at least one of the prisms 91, 92 in Z-direction, the transmitted beam 7,8 is moved laterally in X-direction. The movable prisms are preferably mounted on an actuator 95 similar to the ones used in optical pickups or in loudspeakers. The first prism 91 deflects the incoming beam 7, 8 by an angle of +A, whereas the second prism 92 deflects the beam by an angle of −A. The first prism 91 and the second prism 92 are preferentially made of a glass with a high refractive index. This allows to achieve a high diffraction angle, while keeping the weight of the prisms 91, 92 to a minimum. Instead of a first prism 91 and a second prism 92 it is likewise possible to use first and second diffraction gratings, preferably blazed diffraction gratings for high efficiency. A further alternative is to use holographic elements. The shift in X-direction is linearly proportional to the distance in Z-direction between the two optical components 91, 92. If one of the two optical components 91, 92 is fixed, the shift in X-direction is linearly proportional to the Z-position of the movable optical component. The constant of proportionality depends on the angle A and can be adapted by changing the prism design and material or the grating period, respectively.

Figure 3:
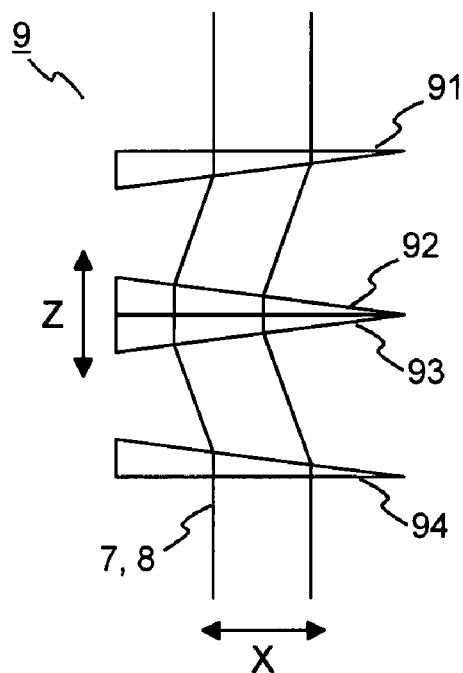
FIG. 3 depicts a second example of a beam shifting element according to the invention.
Figure 4:
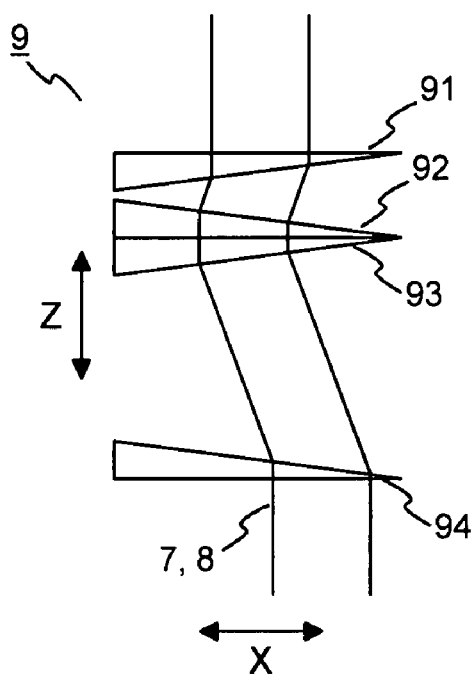
FIG. 4 shows the beam shifting element of FIG. 3 in a first compensation state.
Figure 5:
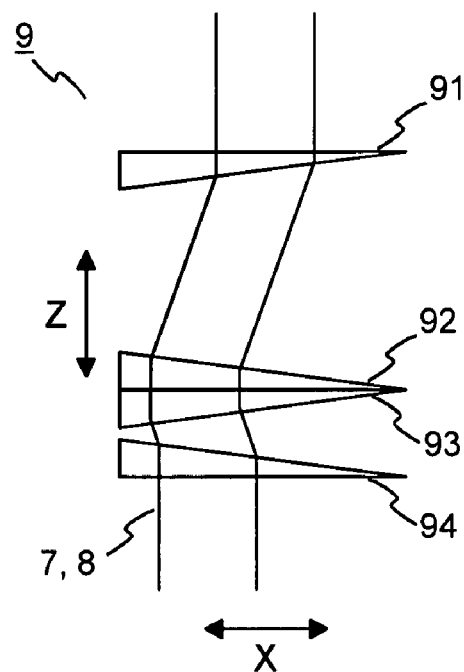
FIG. 5 shows the beam shifting element of FIG. 3 in a second compensation state.

A second example of a beam shifting element 9 according to the invention is shown in FIG. 3. For simplicity the actuator 95 has been omitted in this figure and the following figures. This beam shifting element 9 consists of a combination of four optical components 91, 92, 93, 94. Like in FIG. 2 the optical components are prisms. As can be seen from FIG. 3, the beam shifting element 9 essentially corresponds to the combination of two beam shifting elements 9 of FIG. 2, where one beam shifting element is reversed. The first prism 92 and the fourth prism 94 are preferably fixed, whereas the second prism 92 and the third prism 93 can be moved in Z-direction along the optical axis. The second prism 92 and the third prism 93 are advantageously combined into a single element. In this case only a single element has to be moved. The beam shifting element of FIGS. 3 to 5 has the advantage that a zero position exists, i.e. that the shift in X-direction is zero when the combined second prism 92 and third prism 93 are located in the middle between the first prism 91 and the fourth prism 94. This simplifies the overall layout of the optical setup. A shift of the combined second prism 92 and third prism 93 towards the first prism 91 leads to a shift of the light beams 7, 8 to the right. Correspondingly, a shift of the combined second prism 92 and third prism 93 towards the fourth prism 4 leads to a shift of the light beams 7, 8 to the left. This is depicted in FIGS. 4 and 5, respectively.

Figure 6:
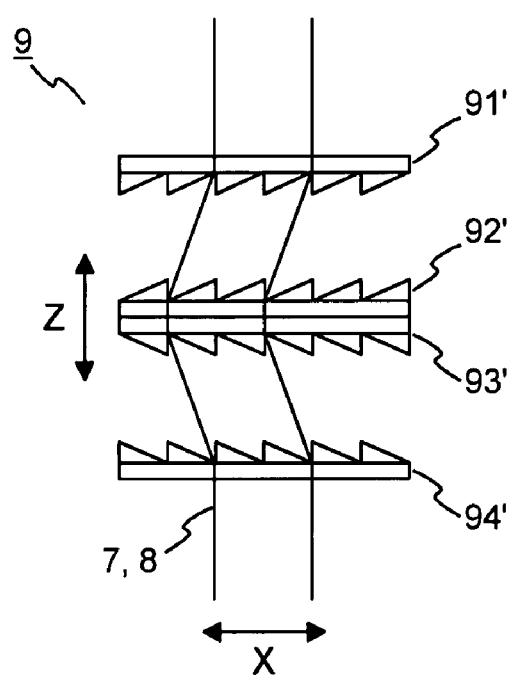
FIG. 6 illustrates a third example of a beam shifting element according to the invention.

A third example of a beam shifting element 9 according to the invention is illustrated in FIG. 6. The beam shifting element 9 corresponds to the compensator 9 of FIG. 3, where the prisms 91, 92, 93, 94 are replaced by diffraction gratings 91', 92', 93', 94'. Advantageously, the second and third diffraction gratings 92', 93' are combined into a single element, e.g. by using a diffraction grating with a suitable grating period. In this case only a thin, lightweight optical component has to be moved. Therefore, beam-shift compensation is possible at high frequency.

In the following a numerical example shall be given for the beam shifting element 9 of FIG. 6. The grating period of all four diffraction gratings 91', 92', 93', 94' is 10 μm. Such gratings can be very easily manufactured. The +1st diffraction order is used for the first grating 91' and the fourth grating 94'. For the second grating 92' and the third grating 93' -1st diffraction order is used. The fixed distance between the first grating 91' and the fourth grating 94' is 2 mm. The simulations were performed with ZEMAX software. A movement of the second grating 92' and the third grating 93' by 1 mm in the Z-direction leads to a lateral shift in the X-direction of 110 μm at a wavelength of 405 nm. The optical aberrations introduced by the system are negligible for an object beam 7 with a numerical aperture NA=0.015, which is typically used in holographic storage systems.

Figure 7:
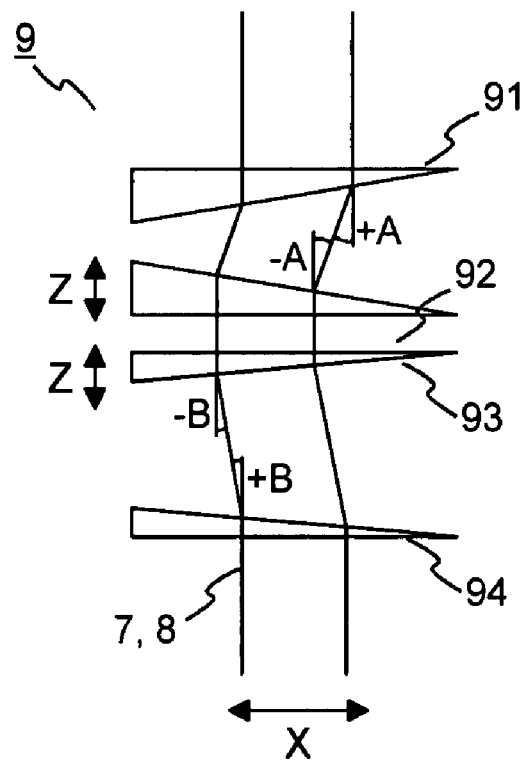
FIG. 7 shows a fourth example of a beam shifting element according to the invention.

In FIG. 7 a fourth example of a beam shifting element 9 is shown. The beam shifting element 9 is illustrated with prisms. Of course, it can likewise be realized with other types of optical elements. In this example the second prism 92 and the third prism 93 are movable independently. In addition, the deflection angles +A, −A of the first prism 91 and the second prism 92 are different from the deflection angles +B, −B of the third prism 93 and the fourth prism 94. Movement of the second prism 92 leads to a coarse shift of the light beam 7, 8, whereas movement of the third prism 93 allows a fine shift of the light beam 7, 8.

Figure 8:
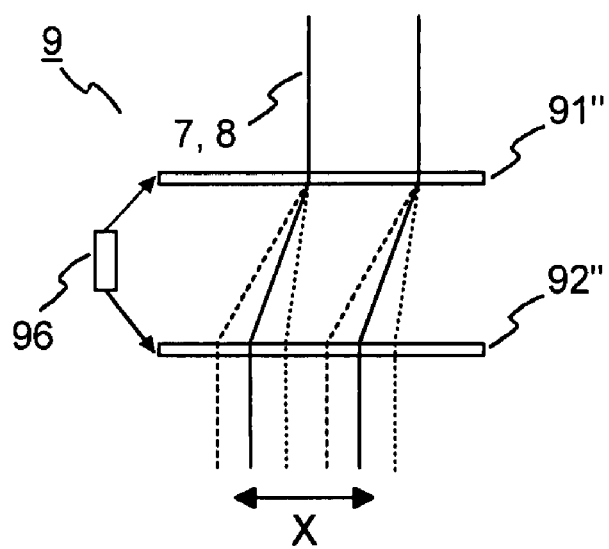
FIG. 8 depicts a fifth example of a beam shifting element according to the invention.

A fifth example of a beam shifting element 9 according to the invention is depicted in FIG. 8. In this embodiment the shift of the light beam 7, 8 is achieved by two optical elements 91", 92" with an adjustable deflection angle. Of course, also four optical elements with an adjustable deflection angle may be used. The deflection angles of the two optical elements 91", 92" are set by a controller 96. In the figure the beam paths for three different deflection angles are shown. Examples of optical elements 91", 92" with an adjustable deflection angle are electrooptic scanners with an adjustable refraction index, or gratings with an adjustable grating period, e.g. liquid crystal gratings. In the latter case the grating period is either continuously adjustable or switchable between a plurality of discrete values. Contrary to the previous embodiments, the beam shifting element 9 of this embodiment does not need any moving parts. In addition, by individually controlling the deflection angles of the optical elements 91", 92", apart from the shift of the light beam 7, 8 also the direction of the light beam 7, 8 can be controlled.

What is claimed is:

1. A beam shifting element comprising:
   at least a first optical element for deflecting an incoming light beam by a first angle and
   a second optical element for deflecting the light beam coming from the first optical element by a second angle of the same absolute value as the first angle but of opposite sign,
   wherein the first optical element and the second optical element are transmissive gratings with an adjustable grating period.

2. The beam shifting element according to claim 1, further comprising:
   a third optical element for deflecting the light beam coming from the second optical element by a third angle, and
   a fourth optical element for deflecting the light beam coming from the third optical element by a fourth angle of the same absolute value as the third angle but of opposite sign.

3. The beam shifting element according to claim 2, wherein the second optical element and the third optical element form a unit.

4. An apparatus for reading from or writing to optical storage media, with a light source for generating a light beam for reading from or writing to an optical storage medium, a collimating lens for collimating said light beam, and an objective lens for focusing said light beam onto said optical storage medium, wherein the apparatus further comprises a beam shifting element according to claim 1 for shifting a said light beam in a first direction perpendicular to said objective lens.

5. The apparatus according to claim 4, further comprising a control element for adjusting the shift of the light beam caused by the beam shifting element.

6. The apparatus according to claim 4, further comprising a beam shifting element for shifting the light beam in a second direction perpendicular to said objective lens.

7. An optical setup, with a light source for generating a light beam and a collimating lens for collimating said light beam, wherein the optical setup further comprises a beam shifting element according to claim 1 for shifting a said light beam in a first direction perpendicular to said collimating lens.

* * * * *